(12) United States Patent
Fichtner-Pflaum

(10) Patent No.: US 11,536,333 B2
(45) Date of Patent: Dec. 27, 2022

(54) ELECTROMAGNETICALLY OPERABLE BRAKE ARRANGEMENT FOR DECELERATING A ROTATIONALLY MOUNTED SHAFT

(71) Applicant: SEW-EURODRIVE GMBH & CO. KG, Bruchsal (DE)

(72) Inventor: Gerolf Fichtner-Pflaum, Kraichtal-Unteröwisheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 257 days.

(21) Appl. No.: 16/482,587

(22) PCT Filed: Jan. 16, 2018

(86) PCT No.: PCT/EP2018/025011
§ 371 (c)(1),
(2) Date: Jul. 31, 2019

(87) PCT Pub. No.: WO2018/141481
PCT Pub. Date: Aug. 9, 2018

(65) Prior Publication Data
US 2020/0072303 A1    Mar. 5, 2020

(30) Foreign Application Priority Data

Jan. 31, 2017    (DE) .................. 10 2017 000 846.9

(51) Int. Cl.
*F16D 59/02*    (2006.01)
*F16D 65/00*    (2006.01)
(Continued)

(52) U.S. Cl.
CPC ......... *F16D 59/02* (2013.01); *F16D 65/0006* (2013.01); *F16D 55/28* (2013.01);
(Continued)

(58) Field of Classification Search
CPC .. F16D 2121/22; F16D 59/02; F16D 65/0006; F16D 2055/0058
See application file for complete search history.

(56) References Cited

U.S. PATENT DOCUMENTS 5,274,290 A * 12/1993 Fischer ................. F16D 55/28
                                                          188/161
5,421,436 A *  6/1995 Lindner ................ F16D 55/36
                                                        188/1.11 R
(Continued)

FOREIGN PATENT DOCUMENTS

CN    101034611 A    9/2007
DE    4126672 A1    2/1993
(Continued)

OTHER PUBLICATIONS

International Search Report dated Apr. 26, 2018, in International Application No. PCT/EP2018/025011 (English-language translation).

(Continued)

*Primary Examiner* — Nicholas J Lane
(74) *Attorney, Agent, or Firm* — Carter, DeLuca & Farrell LLP

(57) ABSTRACT

An electromagnetically operable brake arrangement for decelerating a rotationally mounted shaft, includes a magnet, a coil, a spring element, an armature disk, a brake pad support, a damping plate and a friction disk, the damping plate being situated between the armature disk and the magnet; the damping plate having projections; each of the projections extending further in a radial direction than in a circumferential direction; in particular, the projections each jutting out axially; in particular, at least a subset of the projections being evenly spaced apart from each other in the circumferential direction.

25 Claims, 4 Drawing Sheets

(51) Int. Cl.
  *F16D 55/28* (2006.01)
  *F16D 65/18* (2006.01)
  *F16D 55/00* (2006.01)
  *F16D 121/14* (2012.01)
  *F16D 121/22* (2012.01)

(52) U.S. Cl.
  CPC .... *F16D 65/186* (2013.01); *F16D 2055/0058* (2013.01); *F16D 2121/14* (2013.01); *F16D 2121/22* (2013.01)

(56) References Cited

U.S. PATENT DOCUMENTS

| | | | |
|---|---|---|---|
| 6,193,024 B1 * | 2/2001 | Heppes | F16D 65/0006 188/73.1 |
| 6,321,883 B1 | 11/2001 | Pfann et al. | |
| 2009/0000893 A1 * | 1/2009 | Denys | F16D 65/0971 188/381 |
| 2014/0048359 A1 * | 2/2014 | Olkkonen | F16D 55/06 188/72.3 |
| 2015/0184704 A1 * | 7/2015 | Aschoff | H01F 7/081 188/162 |

FOREIGN PATENT DOCUMENTS

| | | | | |
|---|---|---|---|---|
| DE | 19622983 C1 | | 11/1997 | |
| DE | 102012019001 A1 | | 3/2014 | |
| EP | 1001896 A1 | | 5/2000 | |
| GB | 2243421 A | * | 10/1991 | ............ F16D 59/02 |

OTHER PUBLICATIONS

International Preliminary Report on Patentability issued in International Patent Application No. PCT/EP2018/025011, dated Aug. 15, 2109 (7 pages).

* cited by examiner

ELECTROMAGNETICALLY OPERABLE BRAKE ARRANGEMENT FOR DECELERATING A ROTATIONALLY MOUNTED SHAFT

FIELD OF THE INVENTION

The present invention relates to an electromagnetically operable brake arrangement for decelerating a rotationally mounted shaft.

BACKGROUND INFORMATION

Certain conventional brake set-ups having a coil may be constructed to be operable electromagnetically.

SUMMARY

Example embodiments of the present invention provide a brake arrangement, in which the generation of noise may be reduced and a long service life of the brake arrangement may be attainable.

According to an example embodiment of the present invention, an electromagnetically operable brake arrangement for decelerating a rotationally mounted shaft includes a magnet, a coil, a spring element, an armature disk, a brake pad support, a damping plate and a friction disk; the damping plate being situated between the armature disk and the magnet; the damping plate having projections; each of the projections extending further in a radial direction than in a circumferential direction; in particular, the projections each jutting out axially; in particular, at least a subset of the projections being evenly spaced apart from each other in the circumferential direction.

In this context, it is considered advantageous that no point-shaped projections are used, but line-like projections. Consequently, a long service life with simultaneous, effective noise reduction is achievable, for when the armature disk is pulled by the energized coil to the magnet, it strikes the damping plate, that is, the damping disk. In this instance, the projections act upon the impinging armature disk in an elastically resilient manner and, therefore, suppress the momentum upon impact. Therefore, the generation of noise is reduced. The deformation of the projections is in the elastic range, which means that a long service life is attainable.

A particular advantage hereof is the linear extension of the projections in a radial direction, which produces a lower elastic deflection in comparison with nub-like, that is, point-shaped, projections. Consequently, the service life is increased.

If the armature disk has a minute wobble angle or tipping angle upon impact and, therefore, initially strikes a radially outer spot of the damping plate, the linear configuration hereof functions more effectively than a variant provided with nub-like, that is, point-shaped projections, since the impact may already be damped somewhat earlier and, thus, more effectively.

According to example embodiments, each of the projections has a constant width measured in a tangential direction. In this context, it is considered advantageous that simple manufacturing may be implemented, for the shape must only be correspondingly simple.

According to example embodiments, each of the projections has a width, which is measured in a tangential direction and increases, in particular, monotonically, with increasing radial distance. In this context, it is considered advantageous that when the extension of the respective projection, measured in a circumferential direction, is suitably increased, the ratio of the total of the raised circumferential angular ranges to the total of the non-raised circumferential angular ranges may be arranged to be independent of the radial distance. Thus, a uniform distribution of the projections or of the total raised region is rendered possible.

According to example embodiments, the coil is contained in an annular recess of the magnet; the axis of the annular recess being coaxial with respect to the axis of rotation of the shaft. In this context, it is considered advantageous that the magnet acts as a magnetic yoke, and therefore, an effective brake arrangement may be produced.

According to example embodiments, each of the projections extends radially to the edge of the damping plate. In this instance, it is considered advantageous that an optimum noise-damping effect is attainable, for the impact energy of the armature disk is also damped at the edge, that is, at the greatest radial distance.

According to example embodiments, each of the projections extends to the radially outer edge region of the damping plate. In this case, it is considered advantageous that the armature disk is damped, in particular, radially outwards. This is particularly important, if the armature disk has a minute wobble angle or tipping angle and, consequently, first impinges upon the radially outer edge of the damping plate. In particular, the impingement is also already able to be damped somewhat earlier, and therefore more effectively than in the case of a variant provided with point-shaped, that is, nub-like projections.

According to example embodiments, each of the projections, in the circumferential angular range covered by it, covers a radial distance range, whose maximum radial distance value is equal to the maximum radial distance value of the radial distance region covered by the damping plate in the same circumferential angular region.

According to example embodiments, the damping plate takes the form of sheet metal, in particular, a stamped and bent metallic part. In this context, it is considered advantageous that simple and cost-effective production is rendered possible.

According to example embodiments, the coil is contained in an annular recess of the magnet; in particular, the coil being encapsulated in the annular recess, using potting compound. In this context, it is considered advantageous that simple manufacturing is made possible and tolerances may be compensated for by the potting compound, which means that mechanical stability is attainable.

According to example embodiments, the spring element is supported in the magnet and presses on the armature disk, so that when power is supplied to the coil, the armature disk is pushed towards the magnet in opposition to the spring force generated by the spring element, and when power is not supplied to the coil, the armature disk is pushed away from the coil, in particular, from the magnet, by the spring element. In this context, it is considered advantageous that the brake falls in in response to a power failure and is raisable upon energization.

According to example embodiments, the armature disk is connected to the magnet in a rotatably fixed, but axially displaceable manner; the brake pad support being connected to the shaft in a rotatably fixed, but axially displaceable manner; the friction plate being connected to the magnet, in particular, in the manner of a bayonet joint. An advantage of this is that a simple, robust configuration is made possible.

According to example embodiments, the damping plate is constructed as a perforated disk. In this context, it is considered advantageous that simple manufacture in the form of a stamped metal part is rendered possible.

According to example embodiments, the damping plate is positioned axially between the coil and the armature disk; the armature disk being positioned axially between the damping plate and the brake pad support; the brake pad support being positioned axially between the armature disk and the friction plate. In this context, it is considered advantageous that a simple, robust and low-noise brake arrangement may be produced.

According to example embodiments, the shaft includes external toothing or a part, which has external toothing and is connected to the shaft in a rotatably fixed manner; the brake pad support having internal toothing, which meshes with the external toothing; in particular, the brake pad support being connected to the external toothing in a rotatably fixed, but axially displaceable manner. An advantage of this is that a simple, robust configuration is made possible.

According to example embodiments, the damping plate has a substantially constant thickness, in particular, a thickness, which is measured in an axial direction and is independent of the radial distance and of the circumferential angle. In this context, an advantage is that the damping plate may be made out of inexpensive sheet metal.

Further features and aspects of example embodiments of the present invention are explained in more detail with reference to the appended Figures.

DETAILED DESCRIPTION

Figure 1:
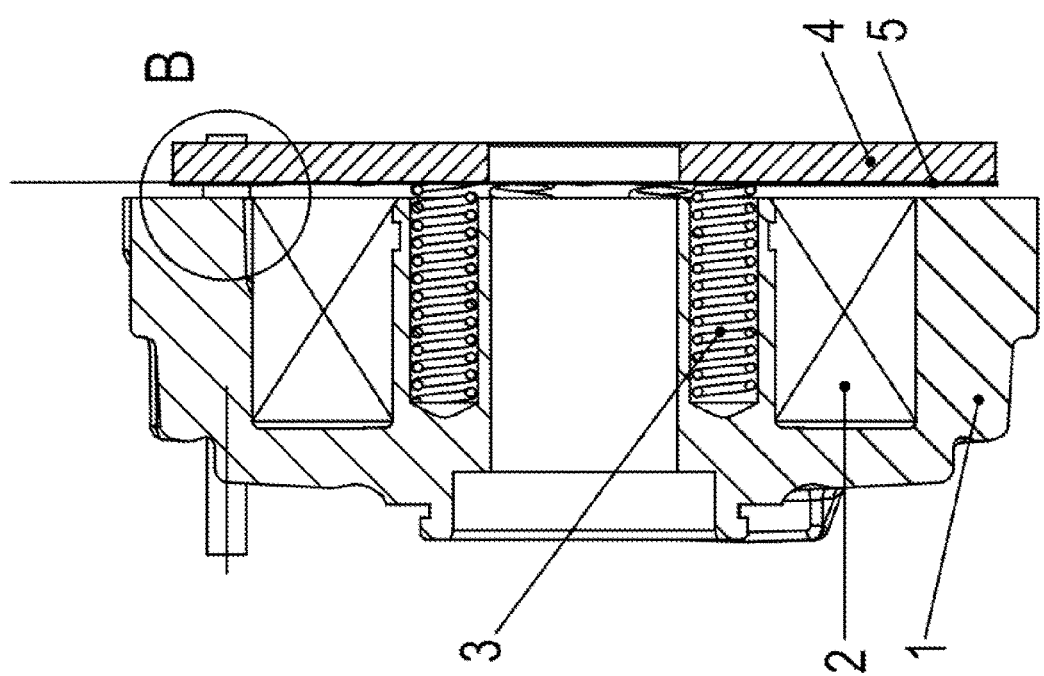
FIG. 1 is a cross-sectional view of a subregion of a brake arrangement according to an example embodiment of the present invention.

A cross-sectional view of a subregion of the brake arrangement according to an example embodiment of the present invention, including damping plate 5, which is situated axially between a magnet 1 and an armature disk 4, is shown in FIG. 1.

Figure 2:
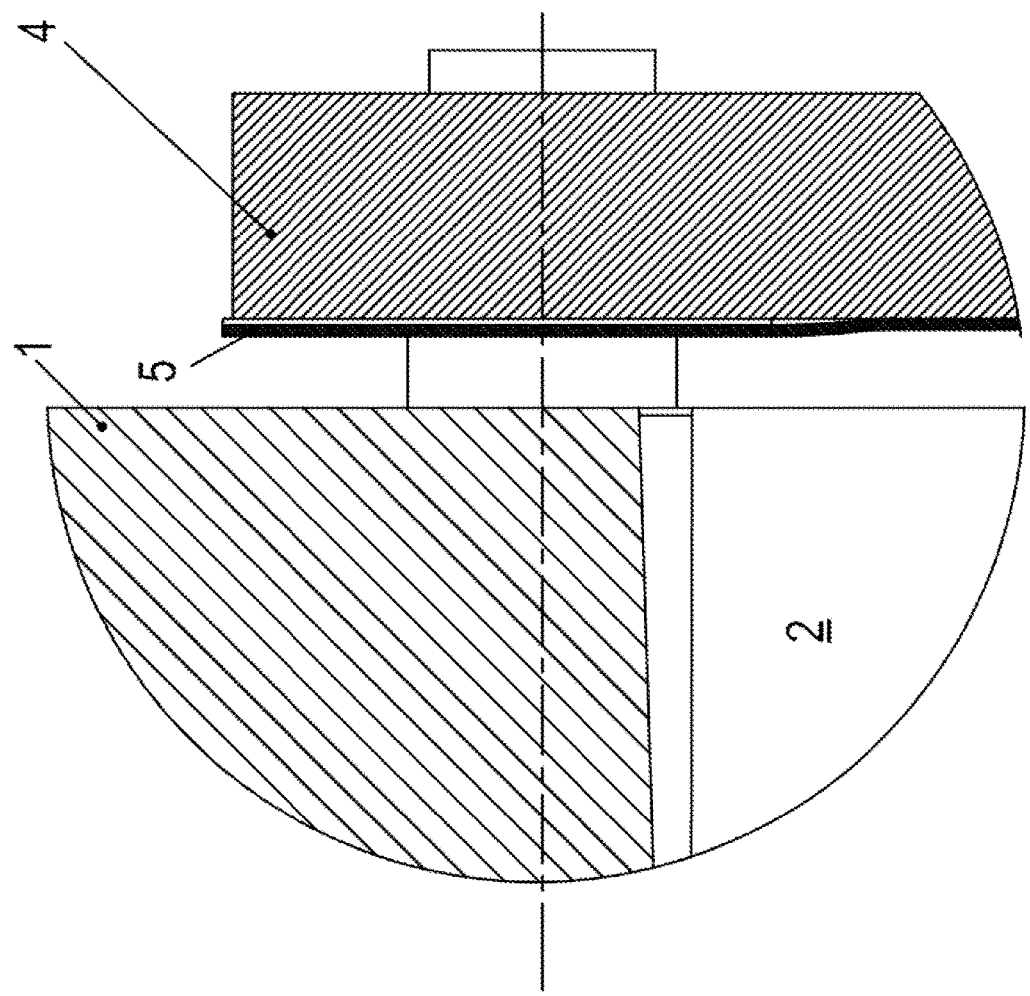
FIG. 2 is an enlarged detail view of the brake arrangement.

An enlarged detail of FIG. 1 is shown in FIG. 2.

Figure 3:
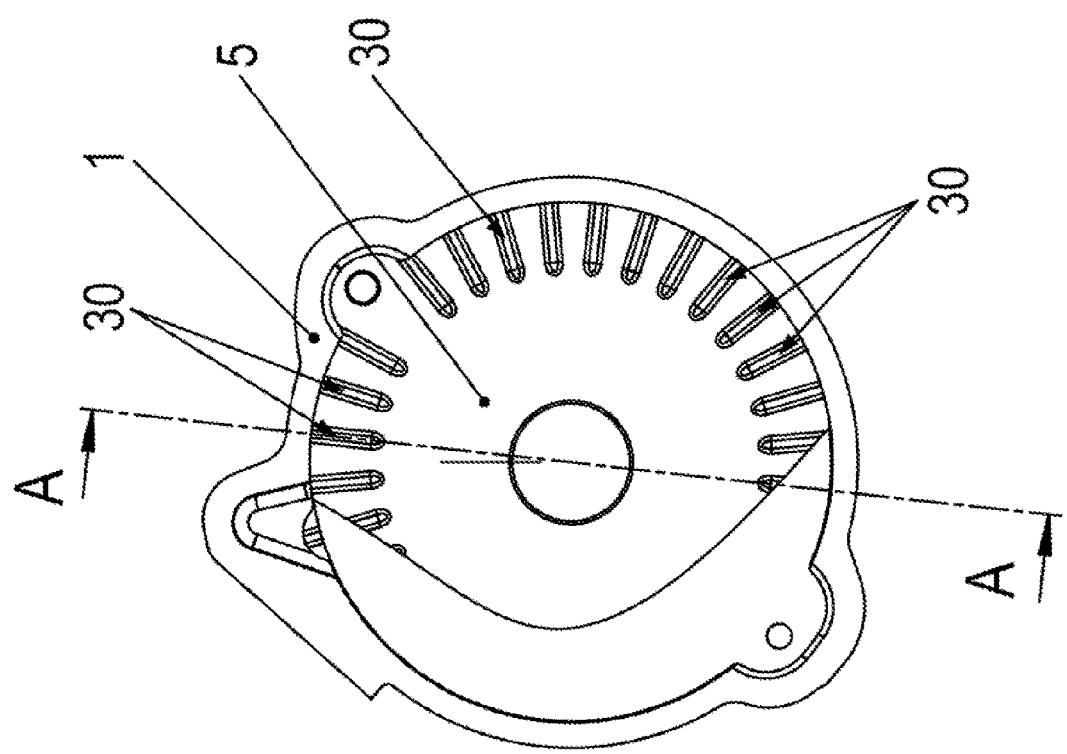
FIG. 3 is a top view of the brake arrangement.

A top view of the brake arrangement in a cutaway state is shown in FIG. 3.

Figure 4:
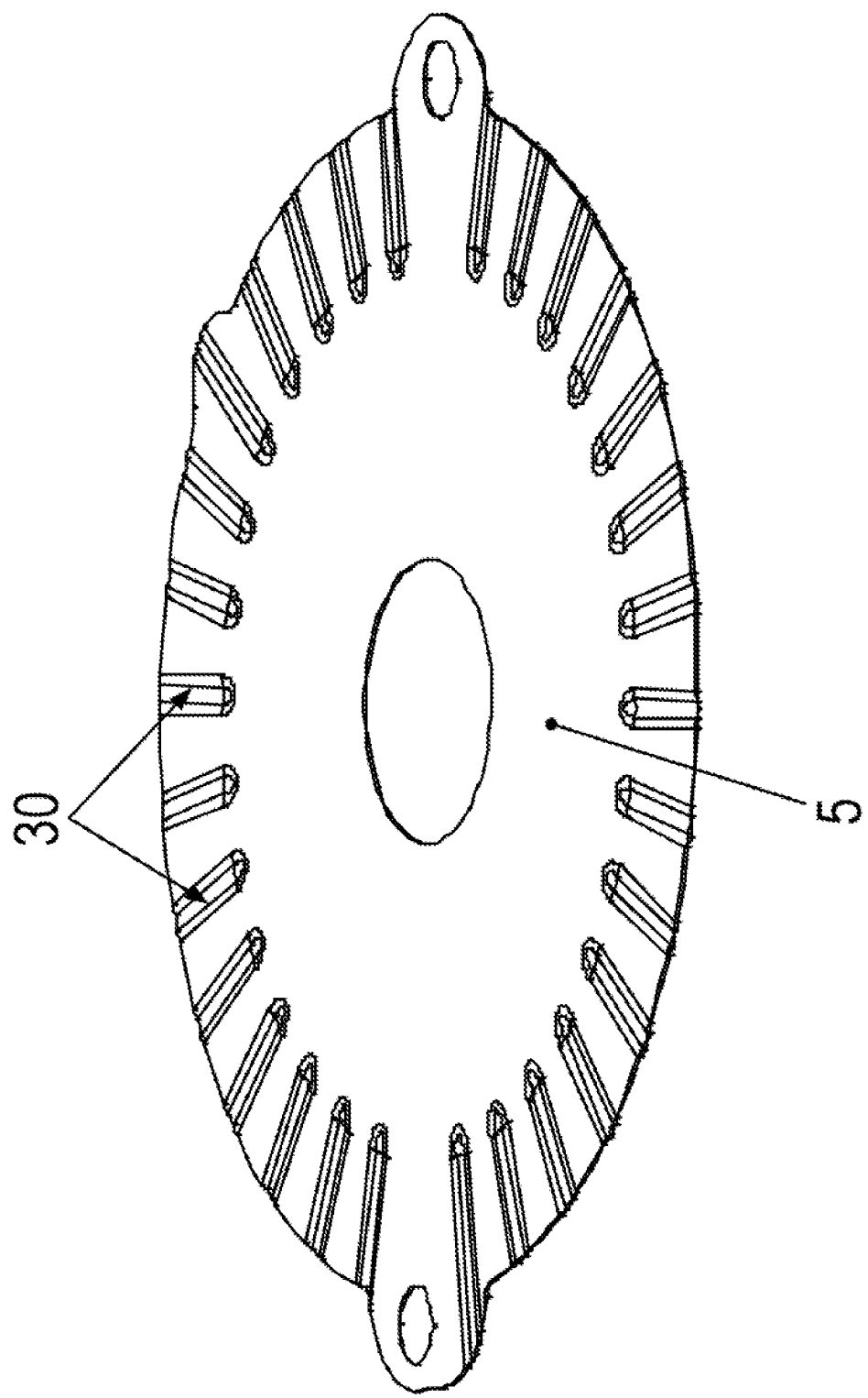
FIG. 4 is a perspective view of the damping plate of the brake arrangement.

An oblique view of damping plate 5 is shown in FIG. 4.

As shown in the Figures, the brake arrangement has a magnet 1, in which an annular groove is provided; a coil 2 capable of being powered being contained in the annular groove. In order to increase stability and decrease the generation of operating noise, coil 2 is cast around in the annular groove, using potting compound.

The axis of the annular groove is oriented parallelly to the axis of the shaft to be decelerated by the brake arrangement. The shaft may be arranged to be concentric with respect to the axis of the annular groove, and therefore, to be capable of being placed in position in the center of the annular groove, the coil and/or the magnet.

The shaft may be supported in a motor, which includes a housing part having a centering collar, which means that the magnet has a center bore alignable with the centering collar. In this manner, the brake arrangement may be centered with respect to the shaft.

A brake pad support is rotatably fixed, but axially displaceable with respect to the shaft. To this end, the brake pad support includes internal toothing, which meshes with outer toothing provided on the shaft or on a part connected to the shaft in a rotatably fixed manner.

A friction plate is connected to the magnet in such a manner, that armature disk 4, coil 2, a spring element 3 supported on magnet 1 and pressing on armature disk 4, and the pad support, as well as damping plate 5, are situated within the space region surrounded by magnet 1, together with the friction plate. Thus, these components are surrounded by magnet 1 in a manner forming a housing.

Damping plate 5 is positioned axially between coil 2 and armature disk 4. Armature disk 4 is positioned axially between damping plate 5 and the brake pad support. The brake pad support is positioned axially between the armature disk and the friction plate. The friction plate may be situated axially between the brake pad support and a bearing flange, that is, in particular, a housing part of the motor. During the mounting of the motor, the friction plate is forced against the bearing flange, so that the frictional heat generated at the friction plate in response to the deceleration of the brake pad support is dissipated via the bearing flange.

Thus, the brake arrangement is electromagnetically operable, for in response to the energization of the coil, armature disk 4 is pulled towards coil 2 in opposition to the spring force generated by spring element 3. The impingement of armature disk 4 upon the material region of magnet 1 having the annular groove is damped with the aid of damping plate 5.

When coil 2 is not powered, the spring force generated by spring element 3 pushes armature disk 4 away from the magnet, in particular, away from coil 2, onto the brake pad support, which is then pressed onto the friction disk.

To this end, armature disk 4 is connected to magnet 1 in a rotatably fixed, but axially displaceable manner. The brake pad support is connectable to the shaft in a rotatably fixed, but axially displaceable manner.

Damping plate 5 has an axially measured thickness at least ten times less than armature disk 4.

Damping plate 5 is constructed as a perforated disk and has projections 30, which are spaced evenly apart from each other in a circumferential direction. The regular spacing is only interrupted at the attachment regions of damping plate 5, for there, damping plate 5 has tab areas, which rise radially outwards and each have a hole, through which a fastening screw is inserted and therefore fixes damping plate 5, that is, connects it to the armature disk in a rotatably fixed manner. Damping plate 5 is bounded by armature disk 4 and magnet 1 in the axial direction. In the area away from the attachment regions in the circumferential direction, damping plate 5 is constructed so as to have a circular periphery.

Projections 30 extend radially beyond a first radial distance, which lies in the radial distance range covered by coil 2. Thus, projections 30 each extend over the entire impact area on the magnet, which armature disk 4 would strike, if damping plate 5 were not interposed.

Projections 30 are extended at least five times further in a radial direction than in the circumferential direction.

In order to produce projections 30, damping plate 5 is made out of sheet metal of a constant thickness, and during the manufacture, projections 30 are produced by deformation, in particular, by pressing it into a corresponding, negative die. Consequently, damping plate 5 has a substantially constant thickness all over.

Thus, projections 30 substantially extend in only a radial direction.

Projections 30 may protrude from the rest of damping plate 5 only in an axial direction. In the circumferential direction, the projections have either a width independent of the radial distance, so that they are simple to manufacture, or they have a width increasing in the radial direction. In this context, the ratio of the total circumferential angle of the raised regions to the total circumferential angle of the non-raised regions may be independent of the radial distance. Therefore, the regions situated radially further outwards are also effectively supported in response to impingement of the armature disk upon the magnet.

In a further exemplary embodiment of the present invention, damping plate 5 is formed without regard to the axial thickness of damping plate 5 in the radial distance range covered by projections 30, according to the axial function $$Z=\sin(N*p/360°*2*Pi),$$

this function being independent of the radial distance, N being a natural number, which is greater than one, and p being the circumferential angle in degrees. Thus, when viewed from the circumferential direction, the axial position is a wave function.

In a further exemplary embodiment, the axial position is determined by $$Z=\Sigma a\_N \sin(N*p/360°*2Pi),$$

the sum running from N=1 to infinity, and the corresponding amplitudes a_N being real numbers. The example embodiment described herein may be represented by a suitable series a_N.

In the case of the above-mentioned projections 30, the width of the specific projection increases in the radial direction, which means that the specific projection resembles an outer cone opened radially outwards.

However, as an alternative, projections 30, which have a constant width in the radial direction, may also be used. Consequently, the tangentially measured width is then independent.

LIST OF REFERENCE CHARACTERS 1 magnet
2 coil
3 spring element
4 armature disk
5 damping plate
30 projection

What is claimed is:

1. An electromagnetically operable brake arrangement for decelerating a rotationally mounted shaft, comprising:
   a magnet;
   a coil;
   a spring element;
   an armature disk;
   a brake pad support;
   a damping plate; and
   a friction plate;
   wherein the damping plate is arranged between the armature disk and the magnet; and
   wherein the damping plate includes projections, each of the projections extending further in a radial direction than in a circumferential direction.

2. The brake arrangement according to claim 1, wherein the projections project axially.

3. The brake arrangement according to claim 1, wherein at least a subset of the projections are evenly spaced apart from each other in the circumferential direction.

4. The brake arrangement according to claim 1, wherein each of the projections has a constant width measured in a tangential direction.

5. The brake arrangement according to claim 1, wherein each of the projections has a width, which is measured in a tangential direction and increases with increasing radial distance.

6. The brake arrangement according to claim 1, wherein each of the projections has a width, which is measured in a tangential direction and increases monotonically with increasing radial distance.

7. The brake arrangement according to claim 1, wherein the coil is contained in an annular recess of the magnet, an axis of the annular recess being aligned coaxially with respect to an axis of rotation of the shaft.

8. The brake arrangement according to claim 1, wherein each of the projections extends radially to the edge of the damping plate.

9. The brake arrangement according to claim 1, wherein each of the projections extends to a radially outer edge region of the damping plate.

10. The brake arrangement according to claim 1, wherein each of the projections, in a circumferential angular range covered thereby, covers a radial distance range, having a maximum radial distance value equal to a maximum radial distance value of a radial distance region covered by the damping plate in the same circumferential angular region.

11. The brake arrangement according to claim 1, wherein each of the projections extends radially to the edge of the damping plate; and/or wherein each of the projections extends to a radially outer edge region of the damping plate; and/or wherein each of the projections, in a circumferential angular range covered thereby, covers a radial distance range, having a maximum radial distance value equal to a maximum radial distance value of a radial distance region covered by the damping plate in the same circumferential angular region.

12. The brake arrangement according to claim 1, wherein the damping plate is formed of sheet metal.

13. The brake arrangement according to claim 1, wherein the damping plate is arranged as a stamped and bent metallic part.

14. The brake arrangement according to claim 1, wherein the coil is contained in an annular recess of the magnet.

15. The brake arrangement according to claim 14, wherein the coil is encapsulated in the annular recess by potting compound.

16. The brake arrangement according to claim 1, wherein the spring element is supported in the magnet and presses on the armature disk, so that when power is supplied to the coil, the armature disk is pushed towards the magnet in opposition to a spring force generated by the spring element, and when power is not supplied to the coil, the armature disk is pushed away from the coil and/or from the magnet by the spring element.

17. The brake arrangement according to claim 1, wherein the armature disk is connected to the magnet in a rotatably fixed, but axially displaceable manner, the brake pad support being connected to the shaft in a rotatably fixed, but axially displaceable manner, the friction plate being connected to the magnet.

18. The brake arrangement according to claim 1, wherein the friction plate is connected to the magnet in a bayonet joint.

19. The brake arrangement according to claim 1, wherein the damping plate is arranged as a perforated disk.

20. The brake arrangement according to claim 1, wherein the damping plate is positioned axially between the coil and the armature disk, the armature disk being positioned axially between the damping plate and the brake pad support, the brake pad support being positioned axially between the armature disk and the friction plate.

21. The brake arrangement according to claim 1, wherein the shaft has external toothing or a part, which has external toothing and is connected to the shaft in a rotatably fixed manner, the brake pad support having internal toothing that meshes with the external toothing.

22. The brake arrangement according to claim 21, wherein the brake pad support is connected to the external toothing in a rotatably fixed, but axially displaceable manner.

23. The brake arrangement according to claim 1, wherein the damping plate has a substantially constant thickness.

24. The brake arrangement according to claim 23, wherein the thickness of the damping plate, measured in an axial direction, is independent of a radial distance and a circumferential angle.

25. An electromagnetically operable brake arrangement for decelerating a rotationally mounted shaft, comprising:
- a magnet;
- a coil;
- a spring element;
- an armature disk;
- a damping plate; and
- wherein the damping plate is arranged between the armature disk and the magnet; and
- wherein the damping plate includes projections, each of the projections extending further in a radial direction than in a circumferential direction.

* * * * *